United States Patent [19]
Jenkins, Jr. et al.

[11] Patent Number: 5,745,033
[45] Date of Patent: Apr. 28, 1998

[54] VEHICULAR REMOTE DISTRESS SIGNAL

[76] Inventors: Joseph Jenkins, Jr.; Karla M. Jenkins, both of 9800 W. Bay Harbor Dr., #503, Bay Harbor Islands, Fla. 33154

[21] Appl. No.: 642,110

[22] Filed: May 2, 1996

[51] Int. Cl.⁶ .................. G08B 1/08; B60Q 1/00
[52] U.S. Cl. .......... 340/539; 340/425.5; 340/825.69; 381/86
[58] Field of Search .................. 340/539, 425.5, 340/426, 692, 225.24, 825.25, 825.45, 825.69, 825.72; 381/86; 455/67.7, 89, 116, 575

[56] References Cited

U.S. PATENT DOCUMENTS

| 3,668,526 | 6/1972 | Raskin | 340/539 |
| 4,360,808 | 11/1982 | Smith, III et al. | 340/539 |
| 4,940,964 | 7/1990 | Dao | 340/539 |

*Primary Examiner*—Donnie L. Crosland

[57] ABSTRACT

A vehicular remote distress signal including a vehicle with an alarm. Also included is a receiver situated within the vehicle and coupled to the alarm. The receiver is adapted to actuate the alarm upon the receipt of a distress signal. Finally, a portable transmitter is adapted to transmit a distress signal upon the instantaneous actuation thereof.

1 Claim, 3 Drawing Sheets

VEHICULAR REMOTE DISTRESS SIGNAL

BACKGROUND OF THE INVENTION

1. Field of the Invention

The present invention relates to a vehicular remote distress signal and more particularly pertains to drawing attention to a victim of an assault in the proximity of a vehicle.

2. Description of the Prior Art

The use of distress signalling devices is known in the prior art. More specifically, distress signalling devices heretofore devised and utilized for the purpose of preventing assault are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,428,607 to Przygoda, Jr. et al.; U.S. Pat. No. 5,365,217 to Toner; U.S. Pat. No. 4,658,237 to Williamson; U.S. Pat. No. 4,777,658 to Wren; U.S. Pat. No. 4,151,507 to Willis; and U.S. Pat. No. 4,742,327 to Burgess et al. are provided as being of general interest.

In this respect, the vehicular remote distress signal according to the present invention substantially departs from the conventional concepts and designs of the prior art, and in so doing provides an apparatus primarily developed for the purpose of drawing attention to victim of an assault in the proximity of a vehicle.

Therefore, it can be appreciated that there exists a continuing need for a new and improved vehicular remote distress signal which can be used for drawing attention to a victim of an assault in the proximity of a vehicle. In this regard, the present invention substantially fullfills this need.

SUMMARY OF THE INVENTION

In view of the foregoing disadvantages inherent in the known types of distress signalling devices now present in the prior art, the present invention provides an improved vehicular remote distress signal. As such, the general purpose of the present invention, which will be described subsequently in greater detail, is to provide a new and improved vehicular remote distress signal which has all the advantages of the prior art and none of the disadvantages.

To attain this, the present invention essentially comprises a vehicle having a plurality of lights coupled to a periphery thereof. The lights are adapted to emit light upon the actuation thereof. Also included is a speaker adapted to transmit an amplified audio signal and further to allow the transmission of a vocal message therefrom upon the actuation thereof. As shown in FIGS. 5 & 6, a receiver is situated discreetly within an interior of the vehicle and electrically coupled to an antenna, the lights, and the speaker. The receiver is adapted to intermittently actuate the lights and speaker upon the receipt of a distress signal. Thus when actuated, the speaker transmits a periodic amplified alarm noise. With reference now to FIG. 2, a portable transmitter has a front face, a rear face, and a periphery situated therebetween thus defining an interior space. The transmitter comprises a microphone, control circuitry, and antenna. The control circuitry is situated within the interior space and is electrically connected to the antenna and microphone. The control circuitry is adapted to transmit a distress signal upon the instantaneous depression of an actuator button situated on the housing. The circuitry is further adapted to transmit via free space a vocal message received from the microphone upon the continuous depression of the actuator button.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicular remote distress signal which has all the advantages of the prior art distress signalling devices and none of the disadvantages.

It is another object of the present invention to provide a new and improved vehicular remote distress signal which may be easily and efficiently manufactured and marketed.

It is a further object of the present invention to provide a new and improved vehicular remote distress signal which is of a durable and reliable construction.

An even further object of the present invention is to provide a new and improved vehicular remote distress signal which is susceptible of a low cost of manufacture with regard to both materials and labor, and which accordingly is then susceptible of low prices of sale to the consuming public, thereby making such vehicular remote distress signal economically available to the buying public.

Still yet another object of the present invention is to provide a new and improved vehicular remote distress signal which provides in the apparatuses and methods of the prior art some of the advantages thereof, while simultaneously overcoming some of the disadvantages normally associated therewith.

Still another object of the present invention is to draw attention to a victim of an assault in the proximity of a vehicle.

Lastly, it is an object of the present invention to provide a new and improved vehicular remote distress signal including a vehicle with an alarm. Also included is a receiver situated within the vehicle and coupled to the alarm. The receiver is adapted to actuate the alarm upon the receipt of a distress signal. Finally, a portable transmitter is adapted to transmit a distress signal upon the instantaneous actuation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
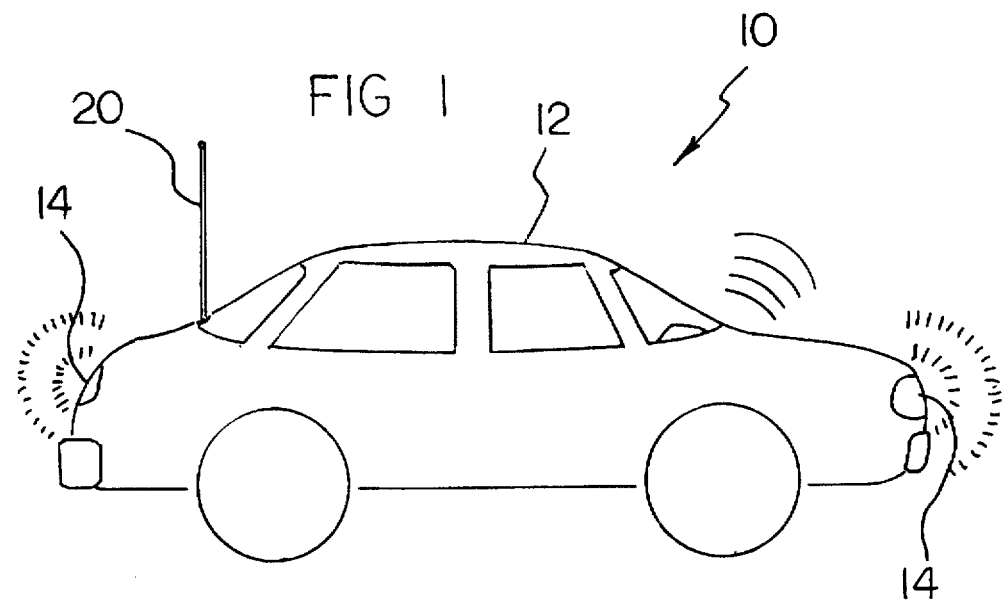
FIG. 1 is a plan illustration of the preferred embodiment of the vehicular remote distress signal constructed in accordance with the principles of the present invention.

With reference now to the drawings, and in particular to FIG. 1 thereof, a new and improved vehicular remote distress signal embodying the principles and concepts of the present invention and generally designated by the reference numeral 10 will be described.

The present invention, the new and improved vehicular remote distress signal, is comprised of a plurality of components. Such components in their broadest context include a vehicle, a receiver, and a transmitter. Such components are individually configured and correlated with respect to each other so as to attain the desired objective.

More specifically, it will be noted that the system 10 of the present invention includes a vehicle 12 having a plurality of lights 14 coupled to a periphery thereof. Such lights preferably consist of standard head lights of the vehicle and may further include the turn signals, brake lights, and reverse lights. The lights are adapted to emit light upon the actuation thereof. Also included is a speaker 16 adapted to transmit an amplified audio signal and further to allow the transmission of a vocal message therefrom upon the actuation thereof.

Figure 5:
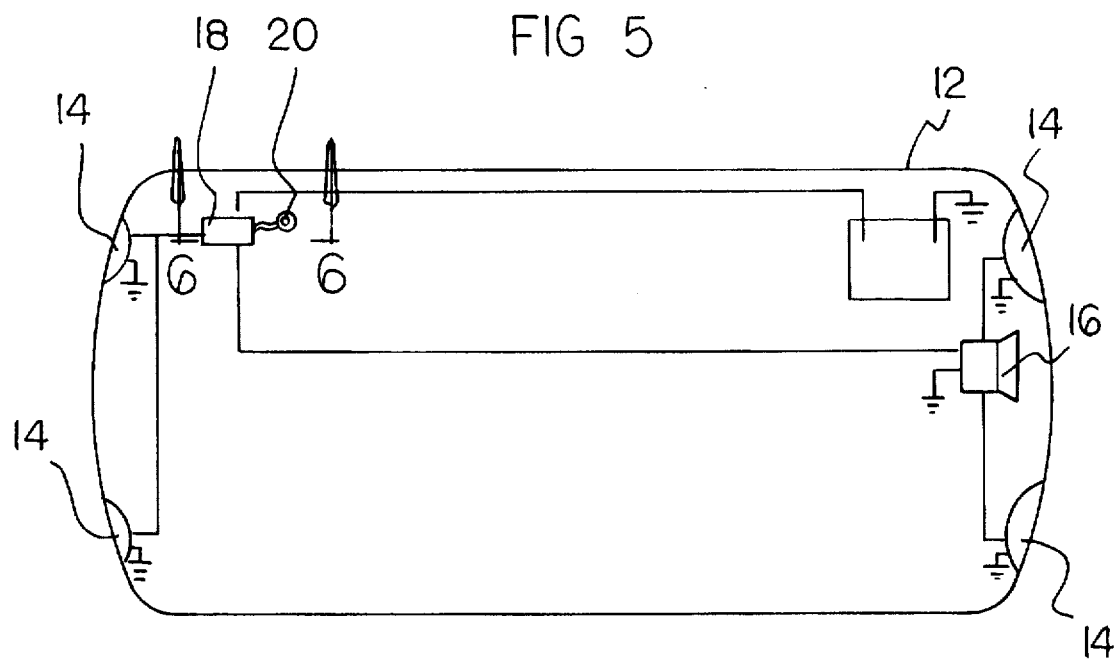
FIG. 5 is a schematic depicting the interconnection of the electrical components employed in the present invention.
Figure 6:
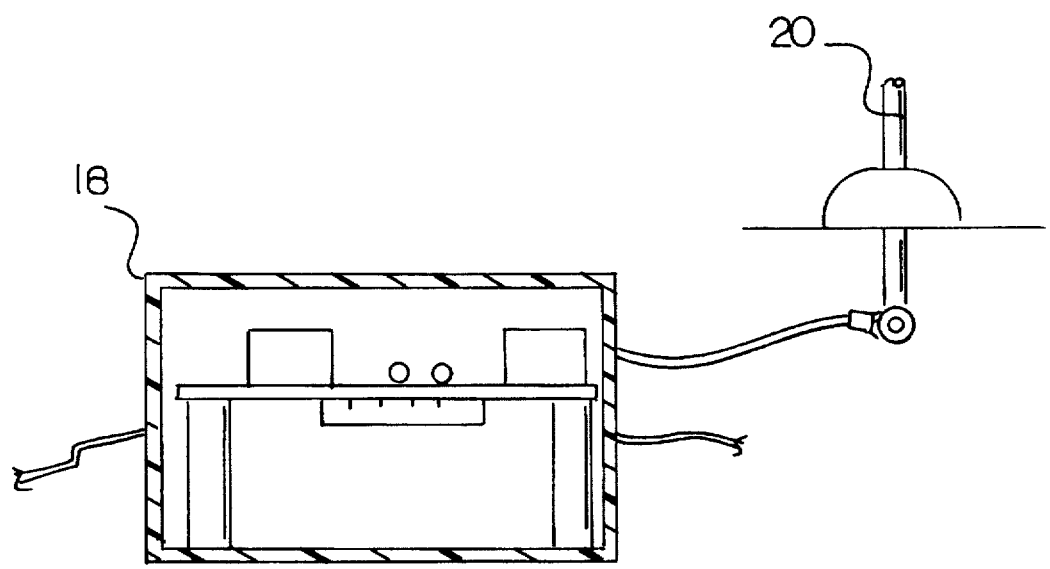
FIG. 6 is a cross-sectional view of the receiver of the present invention.

As shown in FIGS. 5 & 6, a receiver 18 is situated discreetly within an interior of the vehicle and electrically coupled to an antenna 20, the lights, and the speaker. The receiver is adapted to intermittently actuate the lights and speaker upon the receipt of a distress signal. Thus when actuated, the speaker transmits a periodic amplified alarm noise. Upon the receipt of the distress signal, the receiver continuously actuates both the speaker and lights during a predetermined amount of time ranging between five and twenty minutes.

Figure 2:
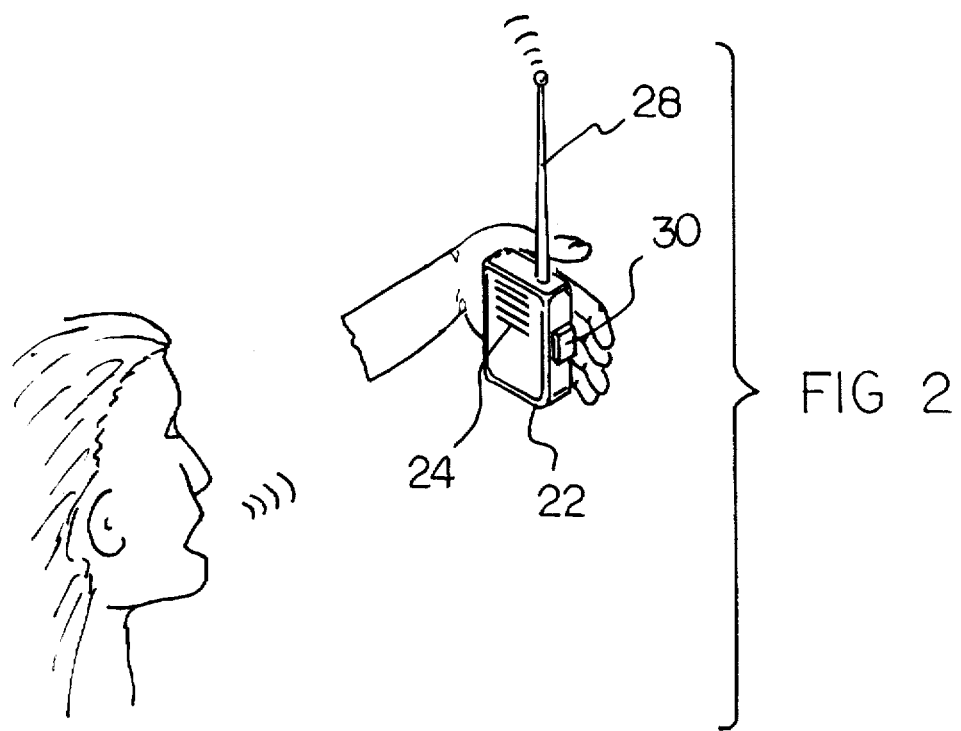
FIG. 2 is a perspective view of the transmitter of the present invention.
Figure 3:
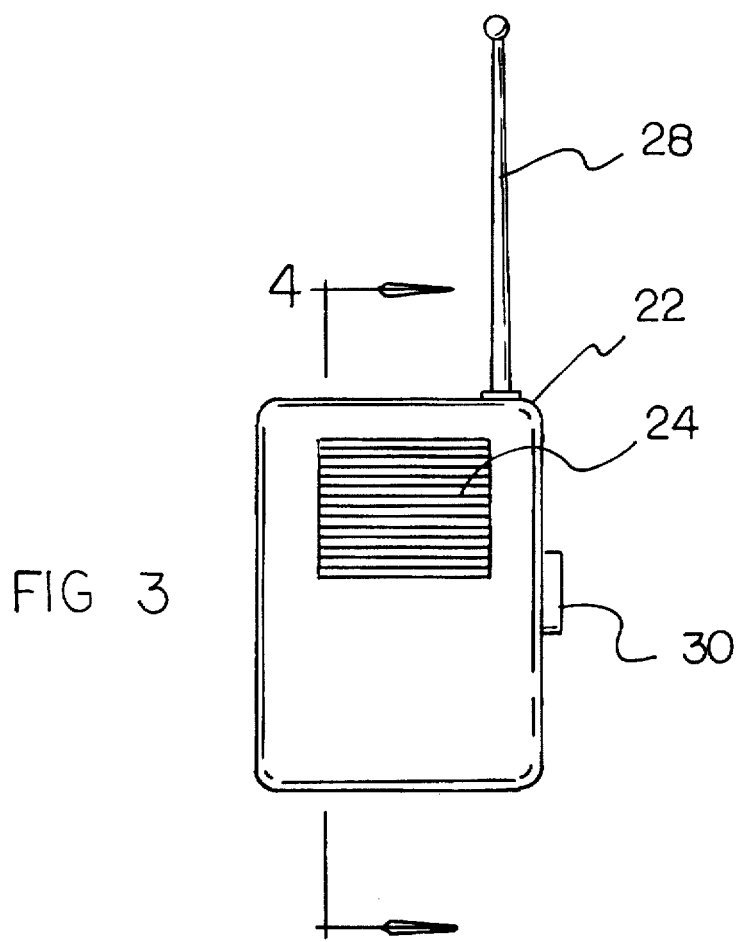
FIG. 3 is a front elevation view of the transmitter shown in FIG. 2.
Figure 4:
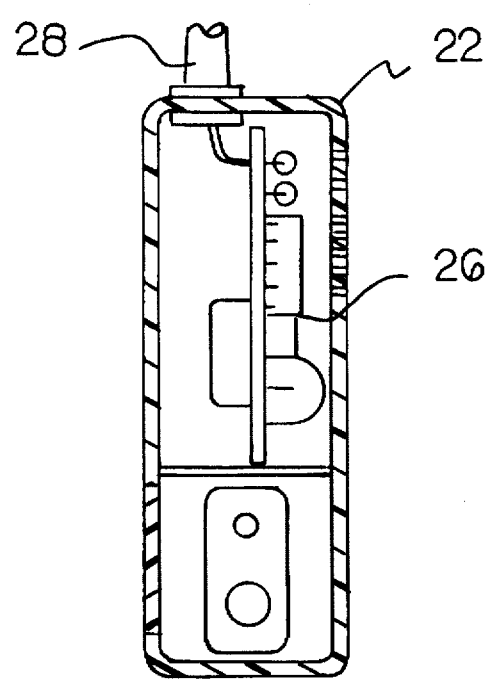
FIG. 4 is a cross-sectional view of the transmitter taken along line 4—4 shown in FIG. 3.

With reference now to FIG. 2, a portable transmitter 22 has a front face, a rear face, and a periphery situated therebetween thus defining an interior space. The transmitter comprises a microphone 24, control circuitry 26, and antenna 28. The antenna suitably comprises a short rubber coil extending from a top surface of the housing. The length of the antenna is less than the height of the transmitter housing with such height being approximately three inches. The control circuitry is situated within the interior space and is electrically connected to the antenna and microphone. The control circuitry is adapted to transmit a distress signal upon the instantaneous depression of an actuator button 30 situated on the housing. The circuitry is further adapted to transmit via free space a vocal message received from the microphone upon the continuous depression of the actuator button.

In use, the transmitter is carried with a user by means of a key chain, clip, or the like. Upon an assault by an aggressor, the actuator button is depressed or a key word voiced to effect intermittent actuating of the speaker and lights. Once activated, the lights and speaker may not be deactivated for approximately 5–20 minutes. At any instant during the activation of the lights and speaker, the user may depress the actuator button and speak into the microphone so that the voice of the victim may be amplified from the speaker situated within the car. During the receipt of the voice message via free space by the receiver, the receiver temporarily ceases the alarm noise so that the amplified voice message may be heard. Such a feature allows a user to specify the location thereof. The present invention is ideal for those who are unable to yell, travelers, elderly, and business persons.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular remote distress signal comprising, in combination:

a vehicle having a plurality of headlights, brake lights, reverse lights and turn signal lights coupled to a periphery thereof and adapted to emit light upon the actuation thereof and a speaker adapted to transmit an amplified audio signal therefrom upon the actuation thereof;

a receiver situated discreetly within an interior of the vehicle and electrically coupled to an antenna, lights, and speaker, the receiver adapted to intermittently actuate the lights and speaker upon the receipt of a distress signal, wherein the speaker transmits a periodic amplified alarm noise and further adapted to allow the transmission of a vocal message from the speaker upon the receipt thereof via free space, wherein the receiver transmits the alarm noise from the speaker for between 5 and 20 minutes; and a portable transmitter with a generally rectangular configuration having a front face, a rear face, and a periphery situated therebetween thus defining an interior space, the housing having a clip for being worn by a user, the transmitter comprising a short rubber coated coil antenna coupled to a top surface of the housing with the length of the antenna being less than a height of the housing and being approximately 3 inches, a microphone, and control circuitry situated within the interior space and electrically connected to the antenna and microphone, the circuitry adapted to transmit a distress signal upon the instantaneous depression of an actuator button situated on the housing or upon the receipt of a specific audio signal by the microphone, wherein the circuitry is further adapted to transmit via free space a vocal message received from the microphone upon the continuous depression of the actuator button, wherein the receiver is adapted to cease the alarm noise from the speaker upon the receipt of the voice message.

* * * * *